(12) United States Patent
Or-Bach

(10) Patent No.: US 6,686,253 B2
(45) Date of Patent: *Feb. 3, 2004

(54) METHOD FOR DESIGN AND MANUFACTURE OF SEMICONDUCTORS

(75) Inventor: Zvi Or-Bach, San Jose, CA (US)

(73) Assignee: eASIC Corporation, San Jose, CA (US)

( * ) Notice: Subject to any disclaimer, the term of this patent is extended or adjusted under 35 U.S.C. 154(b) by 476 days.

This patent is subject to a terminal disclaimer.

(21) Appl. No.: 09/829,939

(22) Filed: Apr. 11, 2001

(65) Prior Publication Data

US 2001/0036688 A1 Nov. 1, 2001

Related U.S. Application Data

(63) Continuation of application No. 09/428,460, filed on Oct. 28, 1999, now Pat. No. 6,245,634.

(51) Int. Cl.[7] .................... H01L 21/76; H01L 21/301

(52) U.S. Cl. .................... 438/401; 438/462; 700/121; 700/125

(58) Field of Search .................... 700/121, 125; 438/401, 462; 709/200, 218

(56) References Cited

U.S. PATENT DOCUMENTS

| | | | |
|---|---|---|---|
| 3,473,160 A | 10/1969 | Wahlstrom | 326/41 |
| 4,197,555 A | 4/1980 | Uehara et al. | 257/209 |
| 4,706,216 A | 11/1987 | Carter | 365/94 |
| 4,827,325 A | 5/1989 | Or-bach et al. | 359/589 |
| 4,866,508 A | 9/1989 | Eichelberger et al. | 326/41 |
| 4,910,417 A | 3/1990 | El Gamal et al. | 326/41 |
| 4,924,287 A | 5/1990 | Orbach | 257/204 |
| 4,933,738 A | 6/1990 | Orbach et al. | 280/432 |
| 4,949,257 A | 8/1990 | Orbach | 705/21 |
| 4,960,729 A | 10/1990 | Orbach et al. | 438/600 |
| 5,027,027 A | 6/1991 | Orbach et al. | 310/317 |
| 5,036,178 A | 7/1991 | Orbach | 219/385 |
| 5,049,969 A | 9/1991 | Orbach et al. | 257/211 |
| 5,068,063 A | 11/1991 | Tremper, III | 252/519.34 |
| 5,111,273 A | 5/1992 | Orbach et al. | 257/206 |
| 5,128,601 A | 7/1992 | Orbach et al. | 372/30 |
| 5,132,571 A | 7/1992 | McCollum et al. | 326/41 |
| 5,138,194 A | 8/1992 | Yoeli | 326/33 |
| 5,191,241 A | 3/1993 | McCollum et al. | 326/41 |
| 5,260,597 A | 11/1993 | Orbach et al. | 257/529 |
| 5,329,152 A | 7/1994 | Janai et al. | 257/529 |
| 5,341,041 A | 8/1994 | El Gamal | 326/44 |
| 5,367,392 A | 11/1994 | Janai | 349/55 |
| 5,404,033 A | 4/1995 | Wong et al. | 257/202 |
| 5,420,544 A | 5/1995 | Ishibashi | 331/11 |
| 5,512,765 A | 4/1996 | Gaverick | 257/202 |

(List continued on next page.)

FOREIGN PATENT DOCUMENTS

WO WO 98/43353 10/1998

OTHER PUBLICATIONS

"Sun offers open–source Sparc to ignite SoC designs," EE Times, Aug. 1999; http://www.eet.com/story/OEG1999909140016.

Details about design support and IP cores from the UMC Group Foundry Service Guide, Mar. 1999.

Primary Examiner—Leo Picard
Assistant Examiner—Sheela S Rao
(74) Attorney, Agent, or Firm—Venable, LLP; Jeffrey W. Gluck

(57) ABSTRACT

This invention discloses a method for designing and manufacturing semiconductors including the steps of: (i) producing a fab-ready design for a semiconductor device by importing into the design at least one core from a remote source, the core bearing an identification indicium, (ii) utilizing the fab-ready design to fabricate the semiconductor device, and (iii) reading the identification indicium from the semiconductor device to indicate incorporation of the at least one core therein.

39 Claims, 4 Drawing Sheets

U.S. PATENT DOCUMENTS

| | | | |
|---|---|---|---|
| 5,526,278 A | 6/1996 | Powell | 716/16 |
| 5,545,904 A | 8/1996 | Orbach | 257/209 |
| 5,550,839 A | 8/1996 | Buch et al. | 714/724 |
| 5,565,758 A | 10/1996 | Yoeli et al. | 326/41 |
| 5,581,098 A | 12/1996 | Chang | 257/211 |
| 5,619,062 A | 4/1997 | Janai et al. | 257/529 |
| 5,679,967 A | 10/1997 | Janai et al. | 257/209 |
| 5,684,412 A | 11/1997 | Yoeli et al. | 326/39 |
| 5,684,812 A | 11/1997 | Shih | 372/19 |
| 5,687,325 A | 11/1997 | Chang | 710/104 |
| 5,751,165 A | 5/1998 | Yoeli et al. | 326/47 |
| 5,757,207 A | 5/1998 | Lytle et al. | 326/39 |
| 5,781,031 A | 7/1998 | Bertin et al. | 326/39 |
| 5,781,033 A | 7/1998 | Galbraith et al. | 326/39 |
| 5,815,003 A | 9/1998 | Pedersen | 326/39 |
| 5,815,726 A | 9/1998 | Cliff | 712/1 |
| 5,818,728 A | 10/1998 | Yoeli et al. | 716/16 |
| 5,825,202 A | 10/1998 | Tavana et al. | 326/39 |
| 5,825,203 A | 10/1998 | Kusunoki et al. | 326/41 |
| 5,861,641 A | 1/1999 | Yoeli et al. | 257/211 |
| 5,883,525 A | 3/1999 | Tavana et al. | 326/39 |
| 5,898,318 A | 4/1999 | Pedersen | 326/39 |
| 5,903,490 A | 5/1999 | Rotem et al. | 365/63 |
| 5,959,466 A | 9/1999 | McGowan | 326/39 |
| 6,020,755 A | 2/2000 | Andrews et al. | 326/39 |
| 6,054,872 A | 4/2000 | Fudanuki et al. | 326/39 |
| 6,066,960 A | 5/2000 | Pedersen | 326/39 |

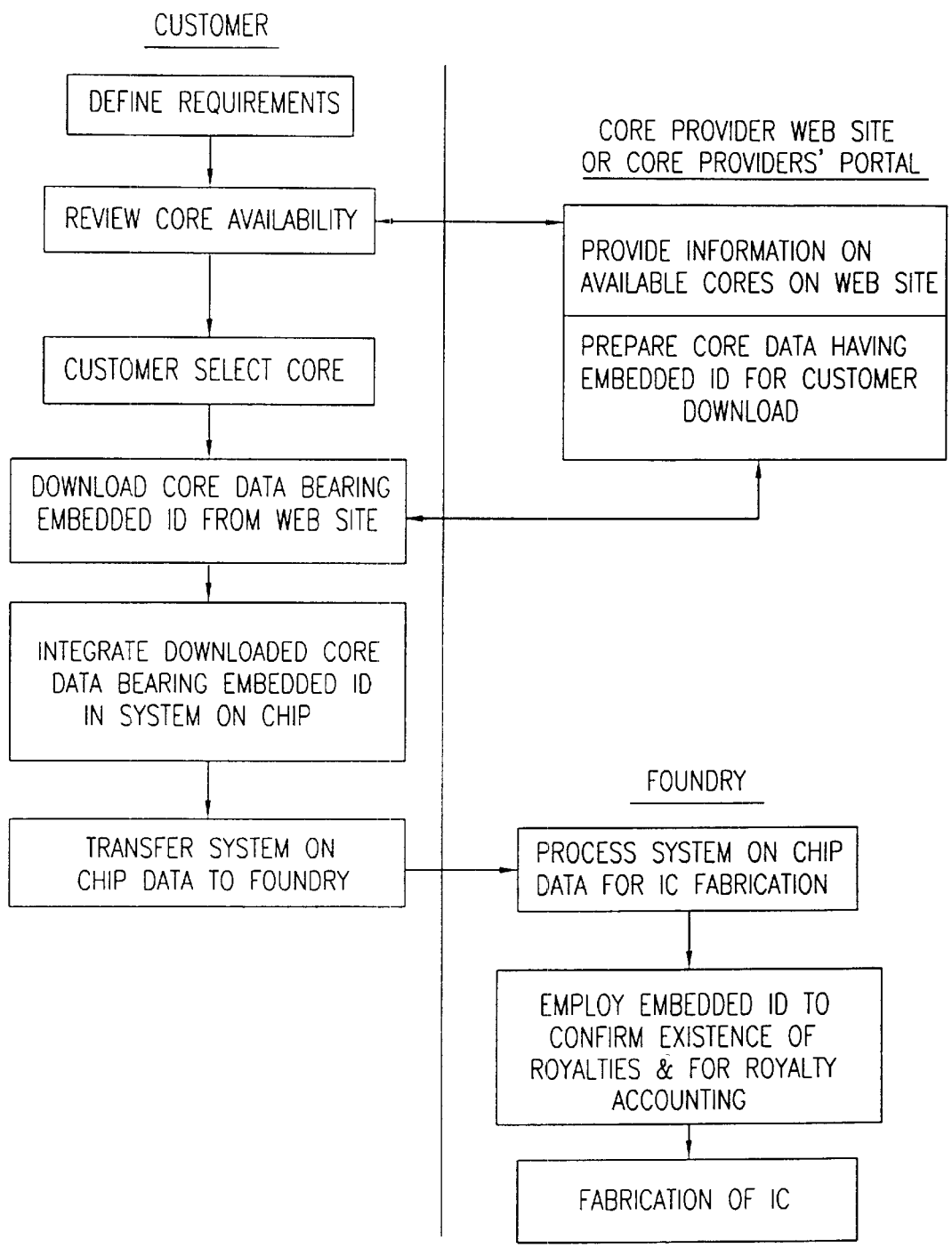

METHOD FOR DESIGN AND MANUFACTURE OF SEMICONDUCTORS

CROSS-REFERENCE TO RELATED APPLICATION

This application is a continuation of Applicant's co-pending U.S. patent application Ser. No. 09/428,460, entitled "A Method for Design and Manufacture of Semiconductors," filed Oct. 28, 1999, now U.S. Pat. No. 6,245,634, and which is incorporated by reference herein in its entirety.

FIELD OF THE INVENTION

The present invention relates to apparatus and techniques for the design and manufacture of semiconductor devices generally.

BACKGROUND OF THE INVENTION

Semiconductor devices, such as ASICs, have traditionally been manufactured by ASIC design and fabrication houses having both ASIC design and fabrication capabilities. Recently, however, the design and fabrication functionalities have become bifurcated, such that a customer may bring his fab-ready design to a fabrication house, having no design capability. The customer may employ conventionally available cell libraries, such as those available, for example, from Artisan or Mentor Graphics together with known design rules, to design their own devices.

Semiconductor design modules having specific functions, known as cores, are also available for integration by a customer into his design. An example of a commercially available core is a CPU core, commercially available from ARM Ltd. of Cambridge, England.

Cores may be provided in a variety of forms. For example, a "soft core" may be in the form of a high level schematic, termed RTL, while a "hard core" may be at a layout level and be designed to specific fabrication design rules.

SUMMARY OF THE INVENTION

The present invention seeks to provide a method for automatic distribution and licensing of semiconductor device cores, particularly "hard cores" as well as a modifiable core particularly suitable for use in the method.

There is thus provided in accordance with a preferred embodiment of the present invention a method for design and manufacture of semiconductors including producing a fab-ready design for a semiconductor device by importing into the design at least one core from a remote source, the core bearing an identification indicium, utilizing the fab-ready design to fabricate the semiconductor device and reading the identification indicium from the semiconductor device to indicate incorporation of the at least one core therein.

In accordance with a preferred embodiment of the present invention, there is provided a programmable or customizable core structure which can be incorporated in a design for a semiconductor device and which enables a user to assemble therewithin both conventional cores and programmable and customizable elements associatable therewith.

In accordance with a preferred embodiment of the present invention, the importing step includes communication of the core via a communications link, preferably the Internet.

Preferably, the reading step is associated with a reporting step which preferably includes reporting to an entity identified in the indicium the quantities and/or sizes of cores fabricated. This reporting step is preferably carried out by the fabrication facilities, preferably the foundry or mask shop as defined hereinbelow.

As the price of tooling and manufacturing such S.O.C's is rapidly growing, and may be expected to exceed the $1 m mark for a 0.12 micron process, it is desirable to share and spread the costs of tooling amongst several customers.

Thus, in accordance with yet another preferred embodiment of the present invention, the method for designing and manufacturing semiconductors may also include the use of a company or body which provides the various services and resources required by a customer to design a required system on a chip (S.O.C.).

In the present specification and claims, the company which provides this service is known as a "Virtual ASIC" company.

An effective way for organizing this service is for the Virtual ASIC company to collate many different S.O.C. designs, which have been developed by other companies and include a wide range of previously built-in options. Each entry into the library or data bank, includes the S.O.C. identification in addition to the identification of the individual core included in it. The Virtual ASIC company would then store all the information in a data bank or library and make it available to different customers.

A customer wishing to design an S.O.C., chooses a device, from the data bank, which is similar to his design requirements. The customer finalizes his own S.O.C. design based on the device design and data stored in the library. A completed S.O.C. design bears the S.O.C. identification, in addition to the identification of the individual core included in it. On completing the design of the S.O.C., the customer may update the data bank held by the Virtual ASIC company with his S.O.C. design and data.

As described by the previous embodiments of the present invention, these design S.O.C.'s may include dedicated computerized functions, such as processors, DSP, and programmable and/or customizable logic.

Using different methods, such as known in the art computer codes, the Virtual ASIC company may calculate the costs for NRE and production which may result from the wafer costs, the royalty obligations to the various bodies which provided the cores, and to the S.O.C. integrator and the other service and customization charges.

Thus, the customer is now able to review the technical capabilities of the chip, the required NRE and the production costs of his design. If the all the requirements of the customer are fulfilled, the customer now go ahead and order the chip.

It is appreciated that such a service may be provided over the Internet to a customer who is interested to implement his own application based on the similar S.O.C. devices which are stored in the data bank of the Virtual ASIC.

The customer may include his own software code for the processors and/or the DSP and to program and/or customize the logic to meet the customer's own particular needs and requirements.

BRIEF DESCRIPTION OF THE DRAWINGS

The present invention will be understood and appreciated more fully from the following detailed description in which:

FIG. 1 is a simplified flowchart illustrating a preferred method of semiconductor design and fabrication in accordance with a preferred embodiment of the present invention;

DETAILED DESCRIPTION OF PREFERRED EMBODIMENTS

Reference is now made to FIG. 1, which illustrates in very general terms a preferred method of semiconductor design and fabrication in accordance with a preferred embodiment of the present invention.

As seen in FIG. 1, in accordance with a preferred embodiment of the present invention, three entities participate in the semiconductor design and fabrication: the customer, a core provider's web site or core provider's portal and a foundry. In a preferred embodiment, the core provider may or may not be the actual developer of the core.

The core provider's web site or a portal providing access to a plurality of web sites of various core providers provides a searchable database describing various cores which are commercially available for use by designers as well as core data suitable for download. In accordance with a preferred embodiment of the present invention, the core data bears embedded identification indicia, which enables the presence of the core data to be readily identified downstream when the core is embedded in a chip design such as a system on a chip design.

The identification indicia may also include version identification indicia which enables updated versions of the core data to be readily cataloged and identified to ensure that the most updated version is incorporated in the chip design.

The cores which are provided via the core provider's web site may be static cores, such as those commercially available from ARM, Ltd. or alternatively customizable or personalizable cores, such as those commercially available from eASIC of San Jose, Calif., USA. In accordance with a preferred embodiment of the present invention, the customer after having defined his requirements dials up to the core provider's web site either directly or via a core providers' portal, identifies a core which appears to fit his requirements and downloads the core data, bearing the embedded identification indicia. It is a particular feature of the present invention that the customer works interactively with the core provider's web site in the core selection process, thus greatly increasing the efficiency of the core selection integration process.

Once the customer has received the core data, he integrates it, including the embedded identification indicia into a chip design, such as a system on a chip design. After carrying out suitable checks, the customer transfers the system on chip data, including the embedded identification indicia, to a foundry.

The foundry processes the system on chip data for IC fabrication and employs the embedded identification indicia to determine the existence and amount of royalties owed to the core providers. Using this information, the foundry provides required cost estimates for the customer. Once these are approved and payment of royalties to the core providers is arranged, fabrication of ICs based on the chip design is carried out.

Figure 2A:
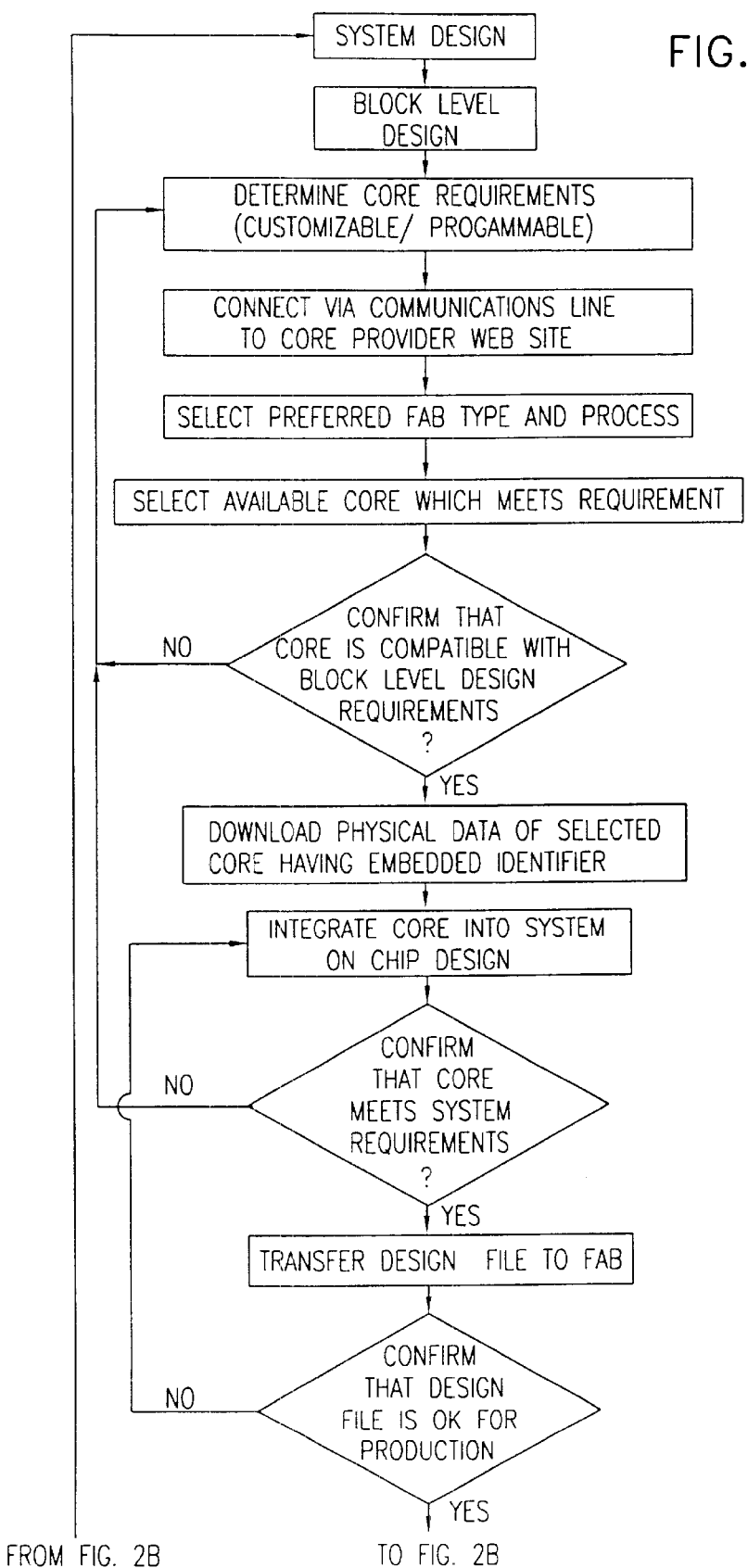
FIGS. 2A–2B are together a flowchart illustrating a preferred method of semiconductor design and fabrication in accordance with a preferred embodiment of the present invention.
Figure 2B:
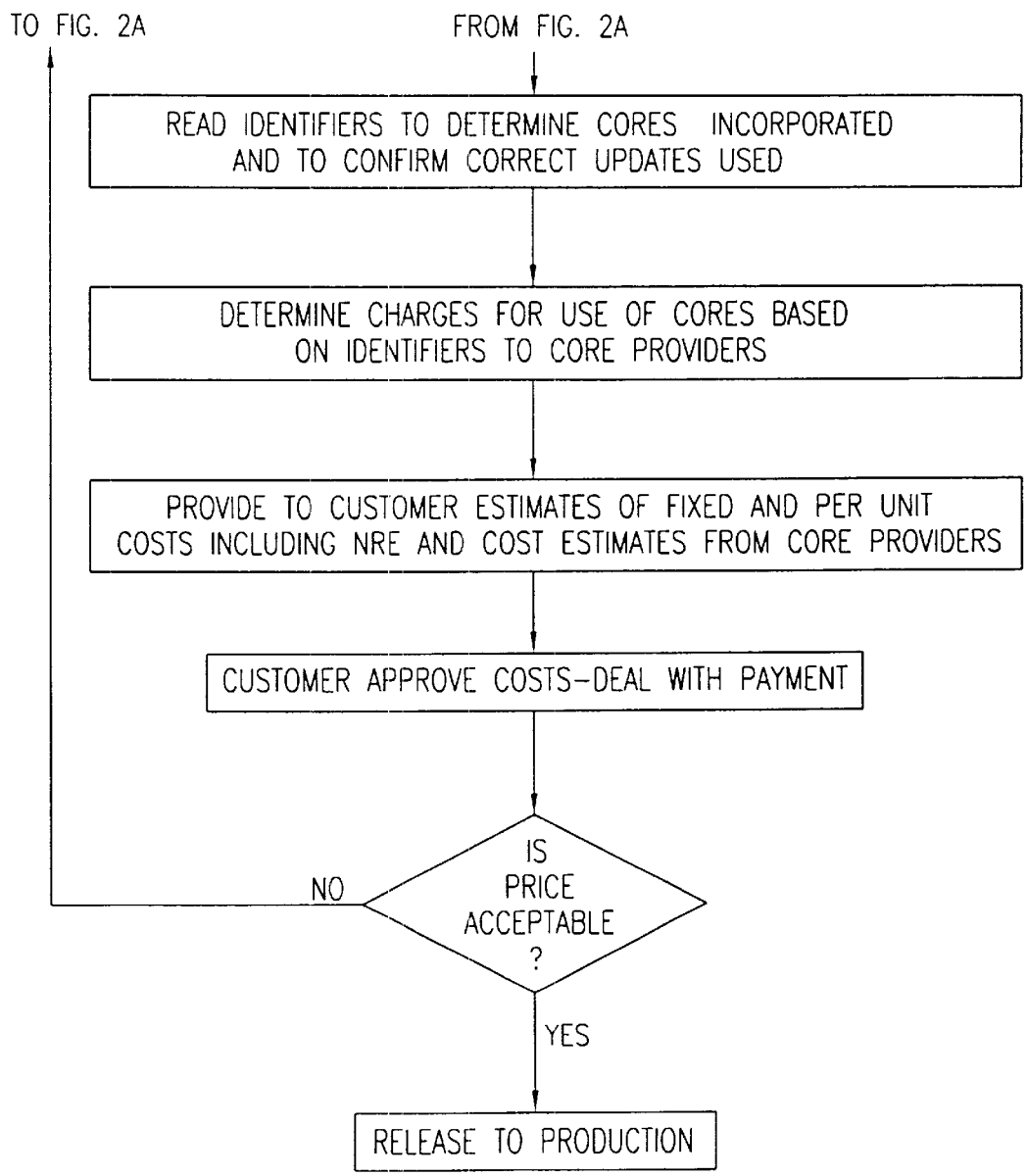

Reference is now made to FIGS. 2A–2B, which are together a flowchart illustrating a preferred method of semiconductor design and fabrication in accordance with a preferred embodiment of the present invention.

As seen in greater detail in FIGS. 2A–2B, prior to interaction with the core provider's web site, the customer completes an overall system design and a block level design in a conventional manner. The customer also determines his core requirements which include performance requirements and whether the core may be static or is required to be customizable and/or programmable.

Once the customer has determined his core requirements he preferably establishes communication with a web site of one or more core providers, preferably via the Internet. Using established menus and interactive searching and selection techniques, the customer selects require parameters of the cores, such as the fab type, for example TSMC and UMC, and the fab process, such as 0.25 micron or 0.18 micron.

The customer then selects an available core which appears to meet the customer's requirements and confirms that the selected core meets the customer's earlier defined block level design requirements. This confirmation is preferably carried out in an interactive manner via the Internet.

If there is an incompatibility between the block level design requirements and the selected core characteristics, the customer preferably revises the block level design to eliminate the incompatibility. This process continues until no incompatibility exists. At that stage the physical data, using industry standard format such as GDS-II, of the selected core is downloaded by the customer, preferably via the Internet.

As noted above, in accordance with a preferred embodiment of the present invention, the core data bears embedded identification indicia, which enables the presence of the core data to be readily identified downstream when the core is embedded in a chip design such as a system on a chip design.

Upon receiving the downloaded core data, the customer integrates it, including the embedded identification indicia, into a chip design, such as a system on a chip design. The customer then checks that the core, as integrated into the chip design, meets the system requirements earlier established by the customer.

If the system requirements are not met, the system design is revised, possibly interactively with the entire core process, preferably via the internet. Once any necessary revisions in the system design have been made and it is determined that the core as integrated fulfills the system requirements, the customer transfers the system on chip data, including the embedded identification indicia, to a foundry. This transfer may also take place via the Internet.

Upon receiving the chip data from the customer, the foundry confirms that the chip data is ready for production. If the data is, for any reason, not ready for production, the foundry interacts with the customer to resolve whatever problems exist. This may require that the customer revise all of its design steps described hereinabove including interaction with the core provider via the Internet.

Once all producibility problems have been resolved, the foundry processes the system on chip data for IC fabrication and employs the embedded identification indicia to determine the existence and amount of royalties owed to the core providers. In accordance with a preferred embodiment of the present invention, the foundry also employs the embedded identification indicia to ensure that the most updated versions of the core data and chip design data are being employed.

Using the embedded indicia and other information, the foundry provides required cost estimates for the customer.

These include NRE costs, which may include NRE payments to core providers, as well as anticipated per unit costs which include per unit royalties to core providers. Once the costs are approved and payment of royalties to the core providers is arranged, fabrication of ICs based on the chip design is carried out.

In another preferred embodiment of the invention, the NRE and/or royalty payments may be made directly to the core developer if the core developer is not the core provider, or the NRE and/or royalty payments may be made directly from the foundry, as opposed to the customer.

In another preferred embodiment of the invention, a fourth entity, the Mask Shop, may confirm the chip data is ready for production and employ the embedded identification indicia to determine the existence and amount of royalties owed to the core providers.

In yet another preferred embodiment of the invention, the embedded identification indicia may include encrypted data, which identifies the size, type and revision of the customizable core. One such method would be to add a mask layer, which contains data necessary to the fabrication of the part, as well as encrypted data for identification and sizing of the core. The necessary fabrication data is extracted and used by combining this layer with other appropriate layers when creating the masks for fabrication. The same process is followed to extract the identification and sizing information, only the choice of operations and mask layers changes. The choice of mask layers and the actual operations are contained within a proprietary process that is provided to the foundry or mask shop by the core developer.

In another preferred embodiment of the invention, the chip data provided by the customer is not sufficient to create the core. Rather, the embedded identification indicia contain references to library data that is provided to the foundry or mask shop by the core developer. The proprietary process would include addition of the appropriate library data, as defined by the embedded identification indicia, into the customer's chip data. In this embodiment the most updated version of the core data may be provided to the foundry or mask shop, by the core developer, within the library data. By including the appropriate library data, the most updated version of core data is thereby employed. In this embodiment, the core provider provides the customer with sufficient information to design and create the chip data, without providing sufficient information to fabricate the core.

Figure 3:
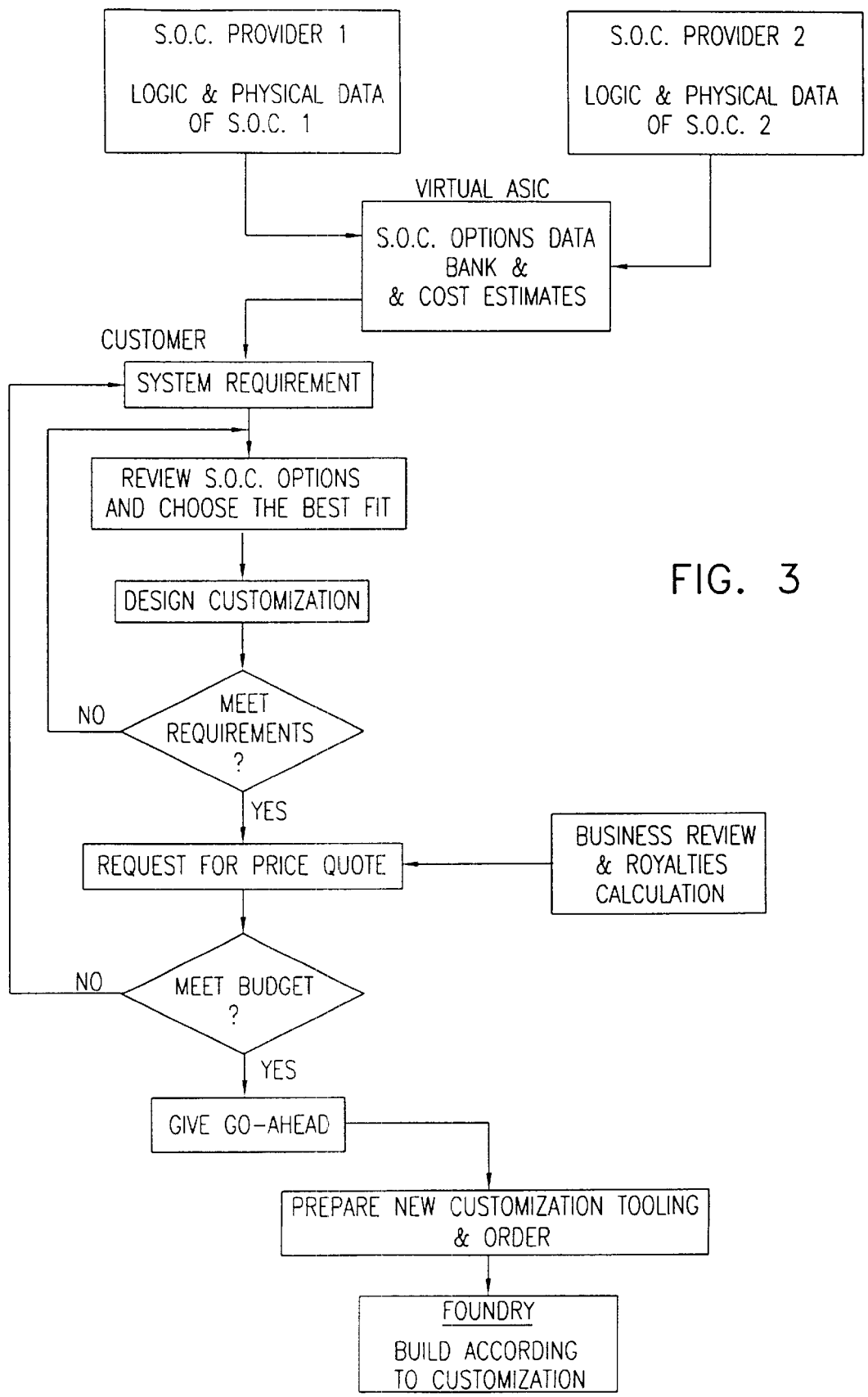
FIG. 3 is a simplified flowchart illustrating the method in which a Virtual ASIC company interacts with a customer to provide cost effective chip production.

Reference is now made to FIG. 3 which presents a simplified flowchart showing the use of a Virtual ASIC company, by a customer, to provide a custom-effective design of an S.O.C.

It is seen in FIG. 3, that various S.O.C. providers forward their programmable and/or customizable S.O.C. options to the Virtual ASIC company. Based on the acquired data, the Virtual ASIC company builds a S.O.C. data bank or library, which also includes the general data for the programmable and customizable portions of each S.O.C. Each entry into the data bank includes an identification code of the various cores provided with each S.O.C. Additionally, the data bank includes a code system for identifying the S.O.C. provider who have given permission to disclose the data, and make available the tooling of the specific S.O.C.

The Virtual ASIC company also provides a cost estimate for the use of the various data options and elements. These cost estimates also include the cost of the wafer and the various cores which are part of the S.O.C.

A customer who wishes to use the data bank so as to integrate the available data into his particular design, for example so as to save on tooling costs, searches the data bank and reviews the various S.O.C. options available from the Virtual ASIC data bank which meet his design requirements.

The customer decides on the particular design available from the data bank, which closely as possible meets his technical requirements. The customer then finalizes his design which includes both programmable and customizable portions.

After confirming that the new S.O.C. design meets the technical requirements, the customer requests a cost estimate for the use of the required data and tooling, typically taking into consideration the costs of various additional factors, such as the cost of the wafer and the cores which form part of the proposed S.O.C., the cost of integrating the design into the S.O.C., and the cost of programming and/or the customization service required.

Additionally, the customer may also perform a business review with the Virtual ASIC company, as to the turn around time of the development phase and NRE and the services costs required.

Once the customer is satisfied with the budgetary considerations, he places an order with the Virtual ASIC to provide the required data and release of the chosen S.O.C. tooling.

The foundry processes the silicon, as required, and delivers the chip to the Virtual ASIC for transfer to the customer.

It will be appreciated by persons skilled in the art that the present invention is not limited by what has been particularly shown and described hereinabove. Rather the scope of the present invention includes both combinations and subcombinations of various features described hereinabove as well as modifications and variations which would occur to persons skilled in the art upon reading the foregoing description and which are not in the prior art.

What is claimed is:

1. A method for design and manufacture of semiconductors comprising:
    producing a design for a semiconductor device by importing into the design at least one core from a remote source, the core bearing an identification indicium;
    utilizing said design to fabricate a semiconductor device, and
    reading the identification indicium from mask data used for the semiconductor device to indicate incorporation of the at least one core therein.

2. A method according to claim 1 and wherein the importing step includes communication of the core via a communications link.

3. A method according to claim 1 and wherein the importing step includes communication of the core via the Internet.

4. A method according to claim 1 and wherein the reading step is associated with a reporting step which preferably includes reporting the quantities of cores fabricated.

5. A method according to claim 4 and wherein the producing step comprises interaction between a customer and a core provider's web site.

6. A method according to claim 5 and wherein the core provider's web site provides a searchable database describing various cores which are commercially available for use by designers as well as core data suitable for download.

7. A method according to claim 6 and wherein the core data bears embedded identification indicia, which enables the presence of the core data to be readily identified downstream when the core is embedded in a chip design.

8. A method according to claim 7 and wherein the identification indicia enables updated versions of the core data to be readily cataloged and identified to ensure that the most updated version is incorporated in the chip design.

9. A method according to claim 5 and wherein the cores which are provided via the core provider's web site are programmable cores.

10. A method according to claim 5 and wherein the cores which are provided via the core provider's web site are customizable cores.

11. A method according to claim 6 and wherein the providing step includes a step wherein the customer after having defined his requirements dials up to the core provider's web site, identifies a core which appears to fit his requirements and downloads the core data, bearing the embedded identification indicia.

12. A method according to claim 1 and wherein the embedded identification indicium can be extracted by combining layers of mask data together.

13. A method according to claim 1 and wherein the embedded identification indicium can be combined with other layers of the mask data to create a correct mask.

14. A method according to claim 1 and wherein said embedded identification indicium can be extracted from the fabricated chip that contains the embedded core or cores.

15. A method according to claim 1 and wherein said design is a fab-ready design.

16. A method according to claim 15 and wherein the importing step includes communication of the core via the Internet.

17. A method according to claim 15 and wherein the reading step is associated with a reporting step which preferably includes reporting the quantities of cores fabricated.

18. A method according to claim 17 and wherein the producing step comprises interaction between a customer and a core provider's web site.

19. A method for design and manufacture of semiconductors comprising:
producing a design for a semiconductor device by importing into the design at least one core from a remote source, the core bearing an identification indicium;
providing said design and said identification indicium to a third party,
wherein said third party utilizes said identification indicium to derive data of said at least one core, and utilizing said design to fabricate the semiconductor device.

20. A method according to claim 19 and wherein said data of said at least one core is fab-ready data.

21. A method according to claim 20 and wherein said design is a fab-ready design.

22. A method according to claim 21 and wherein the importing step includes communication of the core via the Internet.

23. A method according to claim 22 and also comprising a step reading the identification indicium to indicate incorporation of the at least one core therein.

24. A method according to claim 23 and wherein the reading step is associated with a reporting step which preferably includes reporting the quantities of cores fabricated.

25. A method for designing and manufacturing of semiconductors comprising:
a library of plurality of customizable devices, wherein each of said plurality of devices includes an identification code of the ownership of the device.

26. A method according to claim 25 wherein said customizable device is customized for a specific application.

27. A method according to claim 26 wherein said plurality of customizable devices is associated with at least two independent ownership.

28. A method according to claim 27 and wherein the method of designing and manufacturing comprises interaction between a customer and web site hosting said library.

29. A method according to claim 28 and wherein said web site provides a searchable database describing various customizable devices which are commercially available for use by designers as well as devices' data suitable for download.

30. A method according to claim 29 and wherein at least one of said customizable devices comprises one core, and wherein said core bears an identification indicium.

31. A method according to claim 29 and also comprising the step of fabrication said customizable device, and reading the identification indicium to indicate incorporation of the at least one core therein.

32. A method according to claim 31 and wherein the reading step is associated with a reporting step which preferably includes reporting the quantities of cores fabricated.

33. A method for design and manufacture of semiconductors comprising:
a library of plurality of programmable devices, wherein each of said plurality of devices includes an identification code of the ownership of the device.

34. A method according to claim 33 wherein said plurality of programmable devices is associated with at least two independent ownership.

35. A method according to claim 34 and wherein the method of designing and manufacturing comprises interaction between a customer and web site hosting said library.

36. A method according to claim 35 and wherein said web site provides a searchable database describing various programmable devices which are commercially available for use by designers as well as devices' data suitable for downloading.

37. A method according to claim 36 and wherein at least one of said programmable devices comprises one core, and said core is bearing an identification indicium.

38. A method according to claim 37 and wherein said method also comprises the step of fabrication said programmable device, and reading the identification indicium to indicate incorporation of the at least one core therein.

39. A method according to claim 38 and wherein the reading step is associated with a reporting step which preferably includes reporting the quantities of cores fabricated.

* * * * *